United States Patent
Rossi (10) Patent No.: US 11,254,153 B2
(45) Date of Patent: Feb. 22, 2022

(54) MODIFYING CONTROL DATA PACKETS THAT INCLUDE RANDOM BITS

(71) Applicant: HEWLETT-PACKARD DEVELOPMENT COMPANY, L.P., Spring, TX (US)

(72) Inventor: John Rossi, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/769,400

(22) PCT Filed: Feb. 6, 2019

(86) PCT No.: PCT/US2019/016741
§ 371 (c)(1),
(2) Date: Jun. 3, 2020

(87) PCT Pub. No.: WO2020/162899
PCT Pub. Date: Aug. 13, 2020

(65) Prior Publication Data
US 2021/0221155 A1    Jul. 22, 2021

(51) Int. Cl.
*B41J 29/38*        (2006.01)
*G06K 15/10*        (2006.01)
*H04L 7/00*         (2006.01)

(52) U.S. Cl.
CPC ............ *B41J 29/38* (2013.01); *G06K 15/102* (2013.01); *H04L 7/0008* (2013.01)

(58) Field of Classification Search
CPC .......................... B41J 2/04541; B41J 2/04543
See application file for complete search history.

(56) References Cited

U.S. PATENT DOCUMENTS

| | | | |
|---|---|---|---|
| 4,680,780 A | 7/1987 | Agoston et al. |
| 5,012,494 A | 4/1991 | Lai et al. |
| 5,422,662 A | 6/1995 | Fukushima et al. |
| 5,699,515 A | 12/1997 | Berkema |
| 5,760,797 A | 6/1998 | Koizumi |
| 5,838,749 A | 11/1998 | Casper et al. |
| 5,850,422 A | 12/1998 | Chen |

(Continued)

FOREIGN PATENT DOCUMENTS

| | | |
|---|---|---|
| CN | 102176199 A | 9/2011 |
| EP | 0972374 A1 | 1/2000 |

(Continued)

OTHER PUBLICATIONS

Hewlett-Packard Development Company, L.P., Int. Appl. No. PCT/US2019/016734 entitled "Data Packets Comprising Random Numbers For . . . " filed Feb. 6, 2019 (33 pages).

(Continued)

*Primary Examiner* — Julian D Huffman
(74) *Attorney, Agent, or Firm* — Dicke Billig & Czaja PLLC (57) ABSTRACT

A fluid ejection controller interface includes output logic to receive control data packets, each control data packet including a set of primitive data bits and a set of random bits. The fluid ejection controller interface includes counter logic to cause the output logic to output modified control data packets to a fluid ejection controller of a fluid ejection device.

20 Claims, 6 Drawing Sheets

(56) References Cited

U.S. PATENT DOCUMENTS

| | | | |
|---|---|---|---|
| 6,102,510 A * | 8/2000 | Kikuta | B41J 2/04541 347/12 |
| 6,128,098 A | 10/2000 | Kamada et al. | |
| 6,168,252 B1 | 1/2001 | Yaji | |
| 6,266,799 B1 | 7/2001 | Lee et al. | |
| 7,159,959 B2 | 1/2007 | Schremp et al. | |
| 7,419,236 B2 | 9/2008 | Masuda | |
| 7,738,137 B2 | 6/2010 | Graf et al. | |
| 7,866,778 B2 | 1/2011 | Silverbrook et al. | |
| 8,556,364 B2 | 10/2013 | Hoisington et al. | |
| 8,777,364 B2 | 7/2014 | Carrobe et al. | |
| 9,415,585 B1 | 8/2016 | Goyen et al. | |
| 9,597,894 B2 | 3/2017 | Buxton et al. | |
| 9,676,180 B2 | 6/2017 | Gracia Verdugo et al. | |
| 9,701,116 B2 | 7/2017 | Van Brocklin | |
| 9,776,395 B2 | 10/2017 | Anderson et al. | |
| 2003/0142159 A1 | 7/2003 | Askeland | |
| 2005/0105591 A1 | 5/2005 | Egan | |
| 2005/0253894 A1 | 11/2005 | Smektala | |
| 2006/0152572 A1 | 7/2006 | Kasai | |
| 2007/0064083 A1 | 3/2007 | Saquib et al. | |
| 2010/0124329 A1 | 5/2010 | Lyman et al. | |
| 2010/0322249 A1 | 12/2010 | Thathapudi et al. | |
| 2012/0236056 A1 * | 9/2012 | Ito | B41J 2/16585 347/14 |
| 2018/0370227 A1 | 12/2018 | Hayashi | |

FOREIGN PATENT DOCUMENTS

| | | |
|---|---|---|
| JP | H02208052 A | 8/1990 |
| JP | 2008137237 A | 6/2008 |
| KR | 20080006823 A | 1/2008 |
| TW | 201637880 A | 11/2016 |
| WO | WO-2013158105 A1 | 10/2013 |

OTHER PUBLICATIONS

"What is a Kelvin connection and when should it be used?" Jan. 2019 (2 pages).

"Four-Terminal Sensing." Wikipedia: The Free Encyclopedia. Wikimedia Foundation, Inc. Sep. 16, 2018 (3 pages).

* cited by examiner

MODIFYING CONTROL DATA PACKETS THAT INCLUDE RANDOM BITS

CROSS-REFERENCE TO RELATED APPLICATIONS

This application is a U.S. National Stage Application of PCT Application No. PCT/US2019/016741, filed Feb. 6, 2019, entitled "MODIFYING CONTROL DATA PACKETS THAT INCLUDE RANDOM BITS."

BACKGROUND

Many printing devices include at least one fluid ejection device (e.g., print head) designed to house cartridges filled with fluid (e.g., ink or toner in the case of an inkjet printing device, or a detailing agent in the case of a three dimensional printing device). The fluid ejection devices further include at least one nozzle via which the fluid is dispensed from the cartridges onto a substrate (e.g., paper). When printing a document, the print engine controller of the printing device may send commands to the fluid ejection devices that control when the individual nozzles of the fluid ejection devices "fire" or dispense fluid.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

When printing a document, a print engine controller of a printing device may send commands in control data packets to the fluid ejection devices (e.g., print heads), via a data path, that control when the individual nozzles of the fluid ejection devices "fire" or dispense fluid (e.g., ink, toner in the case of an inkjet printing device, or a detailing agent in the case of a three dimensional printing device). For high-density print applications, the various nozzles may be grouped into a plurality of "primitives," such that one nozzle in each primitive fires at any given time based on the data loaded from the print engine controller (e.g., one bit of data per primitive). For lower density print applications, a plurality of primitives may be combined to form a "virtual" primitive in which one nozzle in each virtual primitive fires at any given time (thus, some primitives in the virtual primitive may not fire any nozzles).

Some shift register fluid ejection implementations may allow the insertion of random data in the header of a control data packet. A variable number of random data bits may be added to the header. The random data bits may have no functional impact on real nozzle data and/or control word data, but can provide benefits such as identifying data integrity issues and effectively randomizing or dithering the fire period to spread the frequency of fire-related electromagnetic compatibility emissions. However, some fluid ejection device designs may not utilize a receiver that is compatible with random length headers. These fluid ejection device designs may not operate properly in systems where random length headers are utilized. For example, some fluid ejection device designs may utilize a different control word or datapath structure, so a remapping of bits within the data packet may be performed to provide compatibility. Such a remapping involves a capability to align to the random length header to determine the location of the true control word/data packet.

Some examples of the present disclosure are directed to a fluid ejection array controller interface that determines the location of random data within a control data packet. Alignment to the random length header allows removal of the random header and/or modification of the data packet (including the control word). Some examples of the present disclosure are directed to a fluid ejection array controller interface that removes randomly inserted bits from the header of a control data packet before the control data packet is provided to the fluid ejection device. Some examples disclosed herein allow a system defined for compatibility with a shift register fluid ejection implementation to be used with alternative fluid ejection devices (e.g., by removing the random header), or a system defined for a specific control word bit ordering (e.g., address bit locations) to be used with alternative fluid ejection devices (e.g., by modifying the control word data and/or bit mapping to rearrange the control word bits). Some examples provide a flexible system design for future, undefined fluid ejection architectures.

In one example, the fluid ejection array controller interface includes clock recovery logic to receive a burst mode input clock signal and generate a free-running clock signal. The fluid ejection array controller interface may include counter logic to identify locations of the randomly inserted bits based on the free-running clock signal. The fluid ejection array controller interface includes output logic to remove the randomly inserted bits based on the identification performed by the counter logic, and outputs a modified data packet to the fluid ejection device with the randomly inserted bits removed. The output logic also generates an output clock signal by masking the free-running clock signal during times corresponding to positions of the randomly inserted bits.

Although examples of the disclosure may be discussed within the context of inkjet printing, the techniques disclosed herein may be further applied to control the fluid ejection devices of three dimensional printing devices and other devices that eject fluid such as ink, toner, or the like, or detailing agents (e.g., binder materials, powders, or the like) used in additive manufacturing processes.

Figure 1:
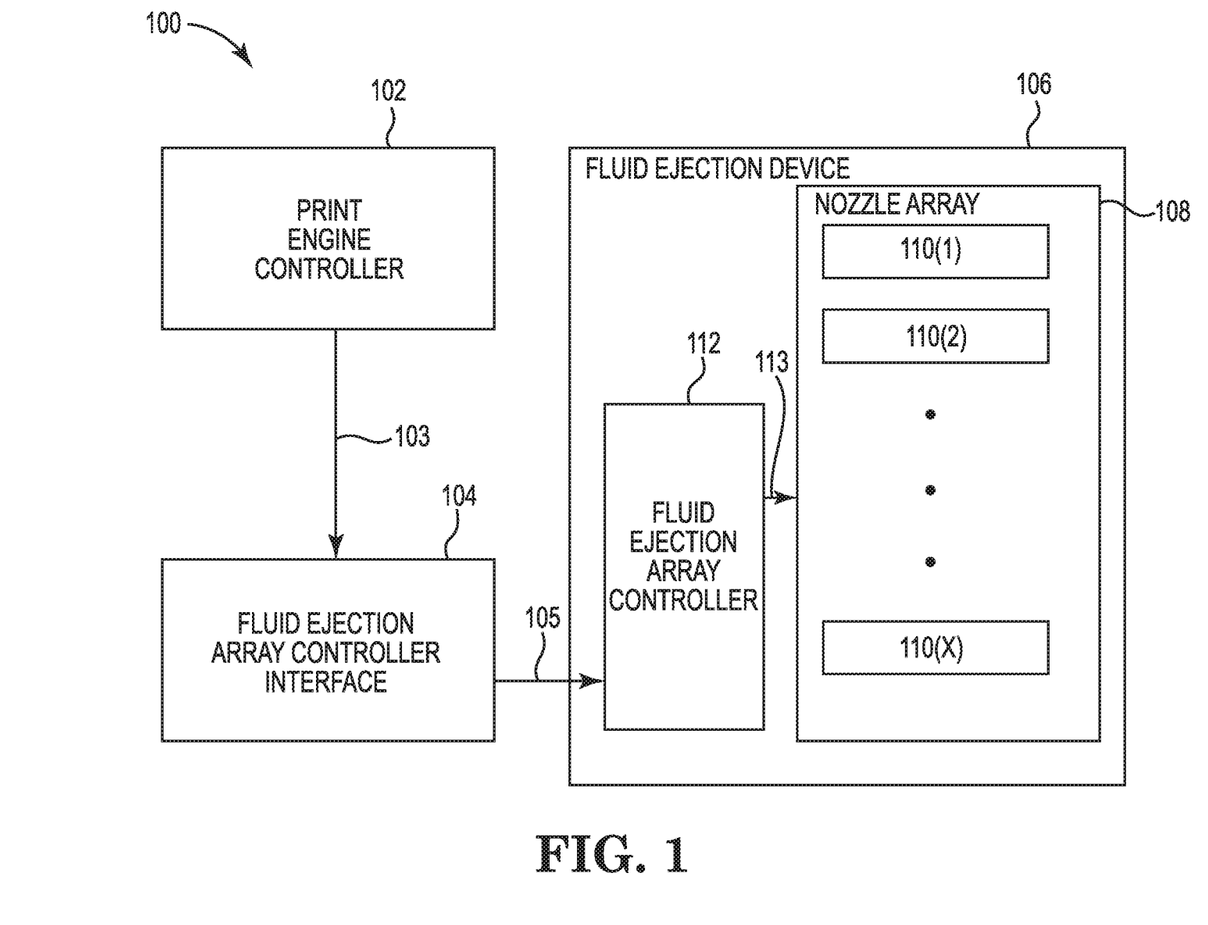
FIG. 1 is a block diagram illustrating elements of a printing device according to one example.

FIG. 1 is a block diagram illustrating elements of a printing device 100 according to one example. Printing device 100 includes a print engine controller 102, a fluid ejection array controller interface 104, and a fluid ejection device 106. In one example, the fluid ejection device 106 may be one of a plurality of fluid ejection devices (e.g., print heads) arranged in a fluid ejection array (e.g., a print bar) of a printing device (e.g., an inkjet printing device or a three dimensional printer). The fluid ejection device 106 includes a nozzle array 108, which further includes nozzle columns 110(1)-110(X) (hereinafter collectively referred to as "nozzle columns 110") arranged in rows along the fluid ejection device 106. Each nozzle column 110 includes a plurality of nozzles arranged to dispense fluid onto a substrate, where the nozzles may be arranged into groups called "primitives." The primitives may be further arranged into groups called "virtual primitives." The number and arrangement of the nozzles may vary depending on the desired print density. The fluid ejection device 106 also includes a fluid ejection array controller 112, which is connected to the nozzle array 108. In some examples, the fluid ejection array controller 112 may also be referred to as a fluid ejection controller, and the fluid ejection array controller interface 104 may also be referred to as a fluid ejection controller interface.

The fluid ejection array controller interface 104 receives control data packets 103 from print engine controller 102 for controlling ejection of fluid by the nozzles of the nozzle array 108. The interface 104 removes randomly inserted bits from the received control data packets 103 to create modified control data packets 105 with the randomly inserted bits removed, and outputs the modified control data packets 105 to the fluid ejection array controller 112. The fluid ejection array controller 112 generates ejection control data 113 for the nozzles of the nozzle array 108 (or, more specifically in some examples, for the virtual primitives of the nozzle array 108) based on the contents of the modified control data packets 105. A data path interconnects the print engine controller 102, the fluid ejection array controller interface 104, and the fluid ejection array controller 112, and transports the control data packets 103 and the modified control data packets 105. The data path may be a high-speed data path, such as a multi-lane serial bus.

In one example, the control data packets 103 are "fire pulse group" (or "FPG") packets containing data about which nozzles of the fluid ejection device 106 should fire. For instance, the control data packets 103 may identify the primitives or virtual primitives containing the nozzles that are to fire, or the packets may contain bits of data for each primitive. One example of a fire pulse group is illustrated in further detail in FIG. 2. The fluid ejection array controller interface 104 can be configured to remove the randomly inserted bits from the received control data packets 103 to create the modified control data packets 105. Based on the information contained in the modified control data packets 105, the fluid ejection array controller 112 writes unique primitive data (e.g., one nozzle's worth of data) to each primitive of the fluid ejection device 106. The unique primitive data is contained in the ejection control data 113. This may involve inserting null values into the control data packets 103 to indicate that a particular primitive should not fire any nozzles.

The fluid ejection array controller 112 may also generate a plurality of nozzle control bits based on the information contained in the modified control data packets 105. The nozzle control bits may include a combination of primitive data, address information, and a FIRE signal local to that primitive. A nozzle control bit instructs an addressed nozzle to fire. In one example, the fluid ejection array controller 112 generates one nozzle control bit for each primitive on the fluid ejection device 106. In one example, the fluid ejection array controller 112 populates the nozzle control bits with bit values (e.g., "0" or "1") that indicate whether a nozzle identified by a corresponding address should fire or not. The fluid ejection array controller 112 may also convey address data to the primitives of the fluid ejection device 106. In one example, the address data identifies (e.g., by corresponding address) which nozzles within the primitives of the fluid ejection device 106 should be fired.

In one example, the fluid ejection array controller interface 104 is implemented as a device that is separate from the fluid ejection device 106 and is positioned between the print engine controller 102 and the fluid ejection device 106. In another example, the fluid ejection array controller interface 104 is integrated into the fluid ejection device 106, and may reside on a common semiconductor die with the fluid ejection array controller 112.

Figure 2:
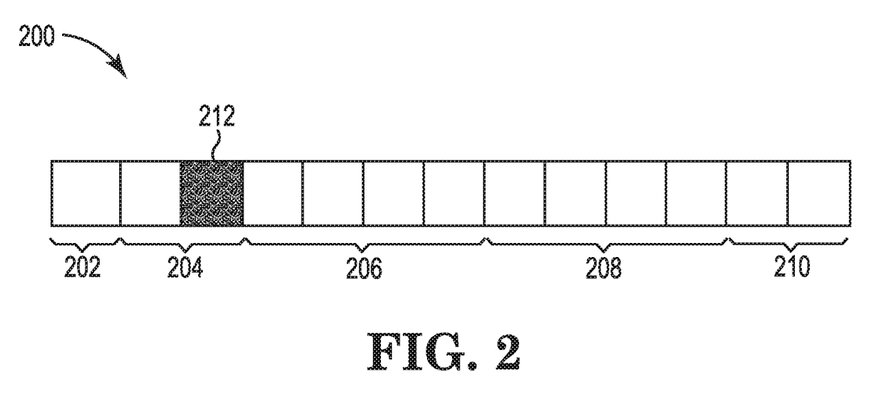
FIG. 2 is a diagram illustrating a control data packet that may be used to communicate commands to fire nozzles of a fluid ejection device according to one example.

FIG. 2 is a diagram illustrating a control data packet 200 that may be used to communicate commands to fire nozzles of a fluid ejection device according to one example. The control data packet 200 is one example of the format of the control data packets 103 (FIG. 1). In one example, the control data packet 200 is a fire pulse group (or FPG) packet. In one example, the control data packet 200 includes random data 202, header 204, a payload comprising a set of address bits 206 and/or a set of fire data bits 208, and a footer 210. The example illustrated in FIG. 2 is an abstraction and is not meant to limit the number of bits that may be included in the packet 200 or in any particular portion of the packet 200.

Random data 202 includes a random number of random data bits added to the front end of the control data packet 200 before the header 204. In one example, the random data 202 is generated by a pseudo-random number generator (PRNG), such as by using a linear feedback shift register approach. The length of the random data 202 (i.e., the number of random data bits included) and the values for the random data bits may both be determined by the PRNG. In one example, the random data 202, having a pseudo-random length, includes 0, 2, 4, 6, or 8 bits of pseudo-random data.

In one example, the header 204 includes bits that are used by the fluid ejection array controller 112 (FIG. 1) to detect the start of the control data packet 200. Thus, the header 204 may include some predefined sequence of bits that indicates the start of a control data packet. In one example, the header 204 additionally includes a set of primitive select bits 212. The primitive select bits 212 may be used, for example, to identify which primitive within a virtual primitive is being addressed (and should, consequently, fire). The primitive select bits 212 may be contained in a different portion of the control data packet 200, such as the payload or the footer 210.

In one example, the set of address bits 206 identifies, for each primitive, an address (also referred to as an "embedded address") corresponding to a nozzle to be fired (i.e., to fire the unique primitive data and eject fluid). In one example, the set of address bits 206 may be omitted from the control data packet 200; in this case, the address bits 206 may be generated by an address generator of the fluid ejection array controller 112.

In one example, the set of fire data bits 208 includes one nozzle's worth of data (e.g., unique primitive data) for each primitive on the fluid ejection device 106. The data included in the set of fire data bits 208 determines whether the nozzle that is identified by the set of address bits within a particular primitive should fire. For instance, the fire data bits 208 may include a non-null value (e.g., "1") to indicate that a nozzle of a primitive should fire. The data included in the set of fire data bits 208 may be different for each primitive.

In one example, the footer 210 comprises bits that are used by the fluid ejection array controller 112 to detect the end of the control data packet 200. Thus, the footer 210 may include some predefined sequence of bits that indicates the end of a control data packet.

Once the control data packet 200 is loaded into the fluid ejection array controller 112, the information bits of data and address are then present at each primitive. It is at this time a fire signal is sent to all primitives (propagated from first to last primitive). This fire signal then generates nozzle control bits, which include a combination of primitive data, address information, and a FIRE signal local to that primitive. The nozzle control bits are then sent to the primitive groups on the fluid ejection device 106, and the primitive groups will fire the nozzles addressed by the nozzle control bits. To fire all of the nozzles on the fluid ejection device 106 in one fire pulse group, a virtual primitive control packet 200 would thus be loaded for every address value.

Figure 3:
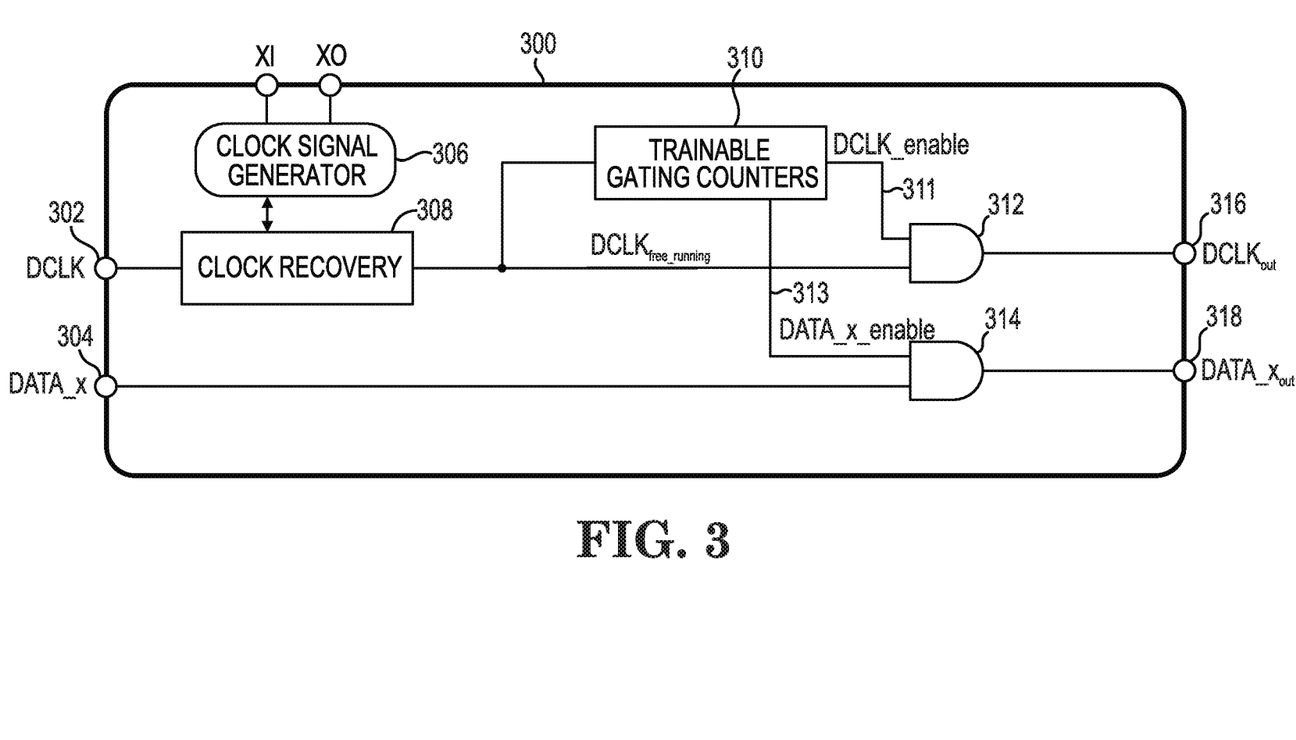
FIG. 3 is a block diagram illustrating a fluid ejection array controller interface according to one example.

FIG. 3 is a block diagram illustrating a fluid ejection array controller interface 300 according to one example. The interface 300 shown in FIG. 3 is one example implementation of the interface 104 shown in FIG. 1. The interface 300 includes DCLK input 302, DATA_x input 304, clock signal generator 306, clock recovery logic 308, trainable gating counters 310, AND gates 312 and 314, $DCLK_{out}$ output 316, and $DATA_{Xout}$ output 318. The clock signal generator 306 may be a phase locked loop or a digitally controlled oscillator. As described in further detail below, data signals and clock signals received by interface 300 are immediately re-driven in real time with minimal latency to the receiving fluid ejection device, with random bits removed. FIG. 3 is described in further detail below with additional reference to FIG. 4.

Figure 4:
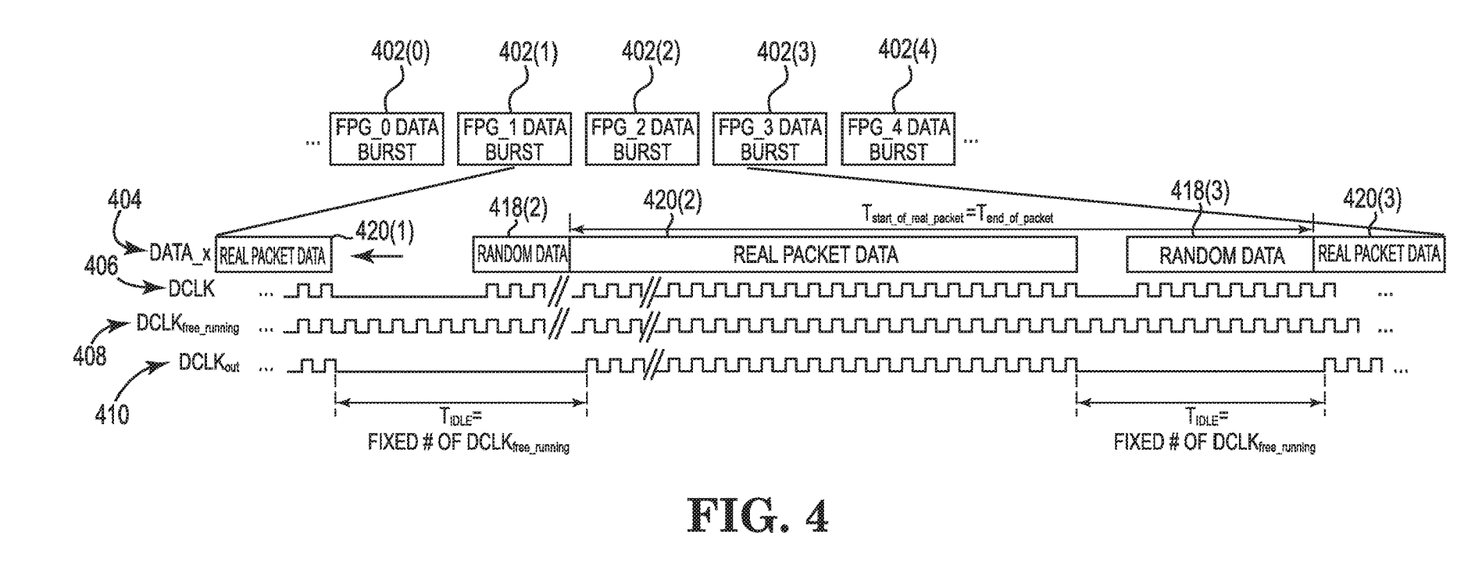
FIG. 4 is a timing diagram illustrating the timing for signals of the fluid ejection array controller interface shown in FIG. 3 according to one example.

FIG. 4 is a timing diagram illustrating the timing for signals of the fluid ejection array controller interface 300 shown in FIG. 3 according to one example. FIG. 4 shows five control data packets 402(0)-402(4) (collectively referred to herein as control data packets 402). In one example, the control data packets 402 are "fire pulse group" (or "FPG") packets or data bursts containing data about which nozzles of the fluid ejection device should fire. Each of the control data packets 402 includes real packet data (e.g., real packet data 420(1), 420(2), and 420(3)) and random data (e.g., random data 418(2) and 418(3)).

FIG. 4 also shows signals 404, 406, 408, and 410. DATA_x signal 404 represents control data packets 402 received by the interface 300 via input 304 and provided in a serial manner to an input of the AND gate 314. DCLK signal 406 represents an input clock signal received by the interface 300 via input 302 and provided to the clock recovery logic 308. $DCLK_{free\_running}$ signal 408 is a free-running clock signal generated by the clock recovery logic 308 based on the DCLK signal 406 and a clock signal provided by the clock signal generator 306. The clock recovery logic 308 outputs the $DCLK_{free\_running}$ signal 408 to the trainable gating counters 310 and to an input of the AND gate 312. $DCLK_{out}$ signal 410 is an output clock signal that is output from AND gate 312 to output 316. AND gate 314 outputs a $DATA_{xout}$ signal, which represents the real packet data (e.g., real packet data 420(1), 420(2), and 420(3)), to output 318. The real packet data for each control data packet that is output by AND gate 314 may also be referred to herein as a modified control data packet.

In one example, inputs 302 and 304 are connected to a print engine controller (e.g., print engine controller 102), and outputs 316 and 318 are connected to a fluid ejection array controller (e.g., fluid ejection array controller 112). In operation according to one example, clock recovery logic 308 receives a burst-mode input DCLK signal 406 via input 302 and a clock signal provided by the clock signal generator 306. Based on these received clock signals, clock recovery logic 308 recovers an internal free-running clock signal, $DCLK_{free\_running}$ signal 408, from the DCLK signal 406 using a clock recovery method. In one example, the $DCLK_{free\_running}$ signal 408 is a phase-locked and continuous clock signal. The clock recovery method may be a phase locked loop method, an oversampling method, or another clock recovery method. The clock recovery logic 308 outputs the $DCLK_{free\_running}$ signal 408 to the trainable gating counters 310 and to an input of the AND gate 312.

The trainable gating counters 310 include counter logic to determine the locations of the random bits of the random data (e.g., random data 418(2) and 418(3)) within the control data packets 402 based on the received $DCLK_{free\_running}$ signal 408. The real packet data (e.g., real packet data 420(1), 420(2), and 420(3)) has a fixed burst period. Because the idle period ($T_{IDLE}$) between real data bursts (non-inclusive of random data insertion) has a fixed period (i.e., a fixed number of $DCLK_{free\_running}$ cycles), the gating counters 310 can be used to count a fixed number of $DCLK_{free\_running}$ cycles (equal to the idle period) and remove/mask these $DCLK_{free\_running}$ cycles from the output clock ($DCLK_{out}$) during the idle period. During time periods corresponding to the real packet data (e.g., real packet data 420(1), 420(2), and 420(3)), gating counters 310 output a $DCLK_{enable}$ signal having a logical high value via communication link 311 to an input of the AND gate 312. This enables the AND gate 312 to output a $DCLK_{out}$ signal 410 that corresponds to the $DCLK_{free\_running}$ signal 408 at the input of the AND gate 312. During time periods corresponding to the random data (e.g., random data 418(2) and 418(3)), gating counters 310 change the $DCLK_{enable}$ signal to a logical low value, which causes the AND gate 312 to mask the received $DCLK_{free\_running}$ signal 408.

During time periods corresponding to the real packet data (e.g., real packet data 420(1), 420(2), and 420(3)), gating counters 310 output a $DATA_{x\_enable}$ signal having a logical high value via communication link 313 to an input of the AND gate 314. This enables the AND gate 314 to output a $DATA_{Xout}$ signal that corresponds to the DATA_x signal 404 at the input of the AND gate 314, and the real packet data is serially driven by the AND gate 314 to the fluid ejection device (e.g., fluid ejection device 106) via output 318. During time periods corresponding to the random data (e.g., random data 418(2) and 418(3)), gating counters 310 change the $DATA_{x\_enable}$ signal to a logical low value, which causes the AND gate 314 to mask the received DATA_x signal 404, thereby blocking the random data. Multiple DATA lanes may also be masked in the manner described above.

The gating counters 310 use a counter target value corresponding to the idle period. The counter target value may be fixed within the gating counters 310, or the gating counters 310 may be adaptive/trainable to determine the idle period and use a corresponding counter target value. Since the real packet data (e.g., real packet data 420(1), 420(2), and 420(3)) has a fixed period (i.e., a fixed number of $DCLK_{free\_running}$ cycles), the gating counters 310 can determine the idle period based on the length of the real packet data and the position of the end of the data burst.

Figure 5:
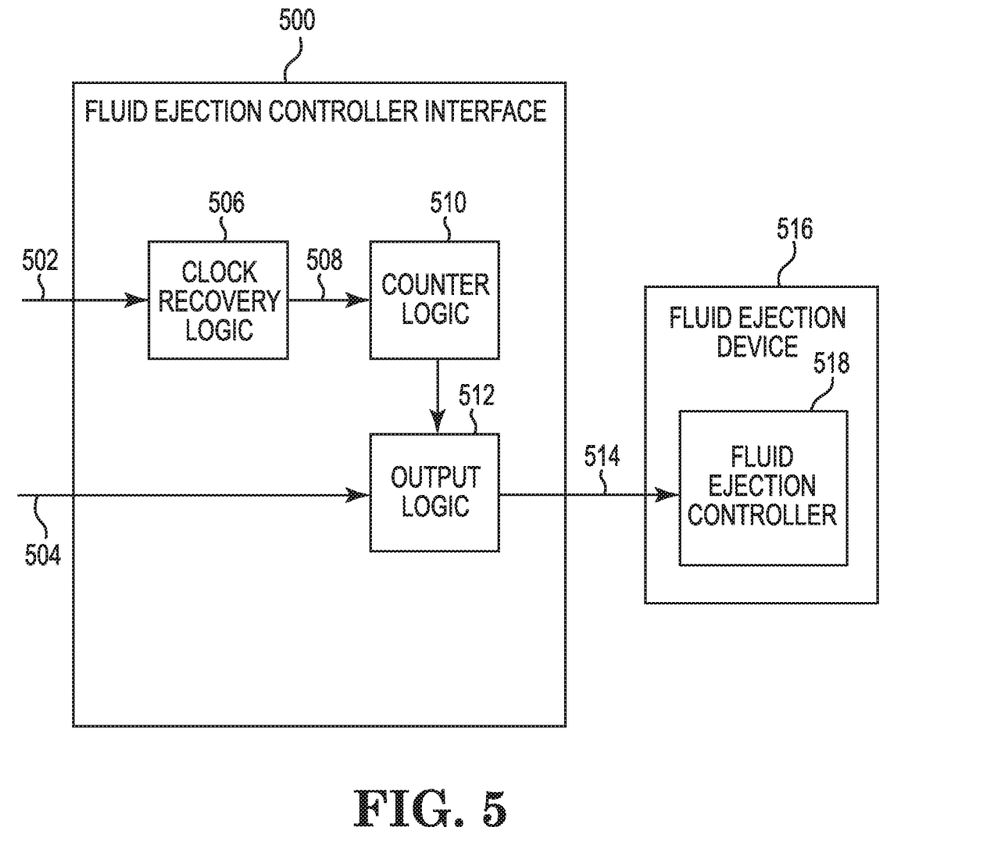
FIG. 5 is a block diagram illustrating an example of a fluid ejection controller interface.

One example of the present disclosure is directed to a fluid ejection controller interface. FIG. 5 is a block diagram illustrating an example of a fluid ejection controller interface 500. The fluid ejection controller interface 500 may include clock recovery logic 506 to receive a burst mode input clock signal 502 and generate a free-running clock signal 508. The interface 500 includes output logic 512 to receive control data packets 504. Each control data packet 504 includes a set of primitive data bits and a set of random bits. The interface 500 includes counter logic 510 to cause the output logic 512 to output modified control data packets 514 to a fluid ejection controller 518 of a fluid ejection device 516. In other examples, the interface 500 may include more or fewer elements, such as the clock recovery logic 506 not being included in the interface 500.

The counter logic 510 may identify positions of the random bits in the received control data packets based on the free-running clock signal. The set of random bits for each control data packet 504 may have a pseudo-random length. Values for the set of random bits for each control data packet 504 may have pseudo-random number values. The counter logic 510 may count clock cycles of the free-running clock signal 508 to identify the positions of the random bits. The output logic 512 may include a logic component to receive the free-running clock signal 508 and output an output clock signal to the fluid ejection controller 518. The counter logic 510 may cause the logic component to mask the free-running clock signal 508 during periods corresponding to the set of random bits for each control data packet 504. The output logic 512 may include a logic component to receive the control data packets 504 and output the modified control data packets 514, and the counter logic 510 may cause the logic component to mask the received control data packets 504 during periods corresponding to the set of random bits for each received control data packet 504. The fluid ejection controller interface 500 may be implemented separate from the fluid ejection device 516. The fluid ejection controller interface 500 may be integrated into the fluid ejection device 516. The fluid ejection controller interface 500 may reside on a common semiconductor die with the fluid ejection controller 518.

The output logic 512 may include modification logic to modify positions and/or values of bits in the received control data packets 504 to facilitate the creation of the modified control data packets 514, and the modified control data packets 514 may or may not include the set of random bits.

Figure 6:
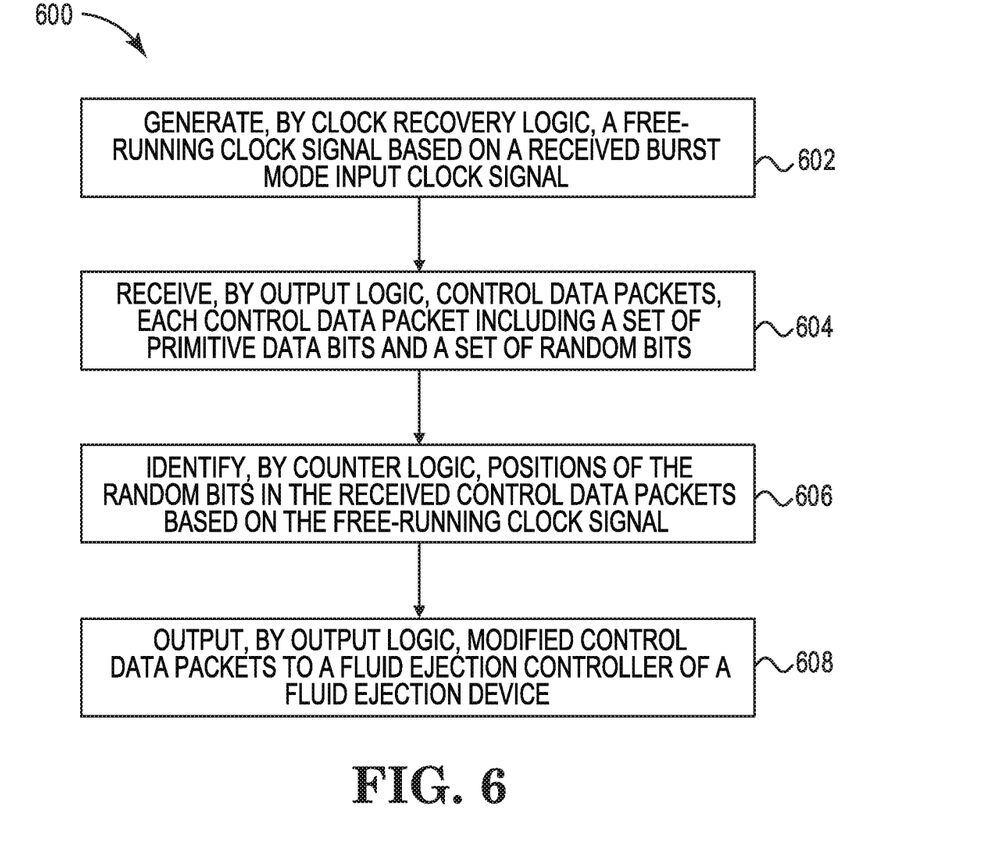
FIG. 6 is a flow diagram illustrating a method of processing control data packets according to one example.

Another example of the present disclosure is directed to a method of processing control data packets. FIG. 6 is a flow diagram illustrating a method 600 of processing control data packets according to one example. At 602, the method 600 includes generating, by clock recovery logic, a free-running clock signal based on a received burst mode input clock signal. At 604, the method 600 includes receiving, by output logic, control data packets, each control data packet including a set of primitive data bits and a set of random bits. At 606, the method 600 may include identifying, by counter logic, positions of the random bits in the received control data packets based on the free-running clock signal. At 608, the method 600 includes outputting, by output logic, modified control data packets to a fluid ejection controller of a fluid ejection device. In other examples, the method 600 may include more or fewer steps, such as the identifying at 606 not being included in the method 600.

The set of random bits for each control data packet in method 600 may have a pseudo-random length, and the values for the set of random bits for each control data packet may be pseudo-random number values. The method 600 may further include receiving, by the output logic, the free-running clock signal; and controlling the output logic, by the counter logic, to generate an output clock signal by masking the free-running clock signal during periods corresponding to the set of random bits for each control data packet. The method 600 may further include removing, by the output logic, the random bits from the received control data packets based on the identified positions of the random bits to create the modified control data packets.

Yet another example of the present disclosure is directed to an apparatus, which includes clock recovery logic to recover a free-running clock signal from a received burst mode input clock signal. The apparatus includes a first output logic component to receive control data packets. Each control data packet includes a set of primitive data bits and a set of random bits. The apparatus includes a second output logic component to receive the free-running clock signal. The apparatus includes counter logic to cause the first output logic component to output modified control data packets to a fluid ejection controller of a fluid ejection device, and to cause the second output logic component to output an output clock signal to the fluid ejection controller.

The counter logic may identify positions of the random bits in the received control data packets based on the free-running clock signal. The counter logic may count clock cycles of the free-running clock signal to identify the positions of the random bits. The counter logic may cause the first output logic component to mask the received control data packets based on the identified positions, and cause the second output logic component to mask the free-running clock signal based on the identified positions.

Aspects of the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed herein can be used to configure a hardware processor to perform the blocks, functions and/or operations of the disclosed methods.

Furthermore, when a hardware processor executes instructions to perform "operations", this could include the hardware processor performing the operations directly and/or facilitating, directing, or cooperating with another hardware device or component, e.g., a co-processor and the like, to perform the operations. The processor executing the machine readable instructions relating to method(s) described herein can be perceived as a programmed processor or a specialized processor. As such, modules for controlling devices disclosed herein, including associated data structures, of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluid ejection controller interface, comprising:
   output logic to receive control data packets, each control data packet including a set of primitive data bits and a set of random bits; and
   counter logic to cause the output logic to output modified control data packets to a fluid ejection controller of a fluid ejection device.

2. The fluid ejection controller interface of claim 1, wherein the counter logic identifies positions of the random bits in the received control data packets based on the free-running clock signal.

3. The fluid ejection controller interface of claim 1, and further comprising:
   clock recovery logic to receive a burst mode input clock signal and generate a free-running clock signal.

4. The fluid ejection controller interface of claim 1, wherein the set of random bits for each control data packet has a pseudo-random length.

5. The fluid ejection controller interface of claim 1, wherein values for the set of random bits for each control data packet are pseudo-random number values.

6. The fluid ejection controller interface of claim 1, wherein the counter logic counts clock cycles of the free-running clock signal to identify the positions of the random bits.

7. The fluid ejection controller interface of claim 1, wherein the output logic includes a logic component to receive the free-running clock signal and output an output clock signal to the fluid ejection controller.

8. The fluid ejection controller interface of claim 7, wherein the counter logic causes the logic component to mask the free-running clock signal during periods corresponding to the set of random bits for each control data packet.

9. The fluid ejection controller interface of claim 1, wherein the output logic includes a logic component to receive the control data packets and output the modified control data packets, and wherein the counter logic causes the logic component to mask the received control data packets during periods corresponding to the set of random bits for each received control data packet.

10. The fluid ejection controller interface of claim 1, wherein the fluid ejection controller interface is implemented separate from the fluid ejection device.

11. The fluid ejection controller interface of claim 1, wherein the fluid ejection controller interface is integrated into the fluid ejection device.

12. The fluid ejection controller interface of claim 11, wherein the fluid ejection controller interface resides on a common semiconductor die with the fluid ejection controller.

13. A method, comprising:
    generating, by clock recovery logic, a free-running clock signal based on a received burst mode input clock signal;
    receiving, by output logic, control data packets, each control data packet including a set of primitive data bits and a set of random bits; and
    outputting, by output logic, modified control data packets to a fluid ejection controller of a fluid ejection device.

14. The method of claim 13, and further comprising:
    identifying, by counter logic, positions of the random bits in the received control data packets based on the free-running clock signal.

15. The method of claim 13, wherein the set of random bits for each control data packet has a pseudo-random length, and wherein values for the set of random bits for each control data packet are pseudo-random number values.

16. The method of claim 14, and further comprising:
    receiving, by the output logic, the free-running clock signal; and
    controlling the output logic, by the counter logic, to generate an output clock signal by masking the free-running clock signal during periods corresponding to the set of random bits for each control data packet.

17. The method of claim 13, and further comprising:
    removing, by the output logic, the random bits from the received control data packets based on the identified positions of the random bits to create the modified control data packets.

18. An apparatus, comprising:
    clock recovery logic to recover a free-running clock signal from a received burst mode input clock signal;
    a first output logic component to receive control data packets, each control data packet including a set of primitive data bits and a set of random bits;
    a second output logic component to receive the free-running clock signal; and
    counter logic to cause the first output logic component to output modified control data packets to a fluid ejection controller of a fluid ejection device, and to cause the second output logic component to output an output clock signal to the fluid ejection controller.

19. The apparatus of claim 18, wherein the counter logic identifies positions of the random bits in the received control data packets based on the free-running clock signal.

20. The apparatus of claim 19, wherein the counter logic counts clock cycles of the free-running clock signal to identify the positions of the random bits, causes the first output logic component to mask the received control data packets based on the identified positions, and causes the second output logic component to mask the free-running clock signal based on the identified positions.

* * * * *